United States Patent [19]

Rost

[11] 3,721,344

[45] March 20, 1973

[54] APPARATUS FOR TREATING WASTE WATER

[75] Inventor: Kai Lennart Rost, Hallowell, Maine

[73] Assignee: Pollutrol Industries Inc., Portland, Maine

[22] Filed: July 22, 1971

[21] Appl. No.: 164,996

Related U.S. Application Data

[63] Continuation of Ser. No. 57,290, July 22, 1970, abandoned, which is a continuation of Ser. No. 794,118, Jan. 22, 1969, abandoned.

[52] U.S. Cl. .................210/104, 210/110, 210/124, 210/127, 210/139
[51] Int. Cl. ...........................................B01d 29/24
[58] Field of Search......210/104, 109, 110, 124, 127, 210/138, 139, 195

[56] References Cited

UNITED STATES PATENTS

| | | | |
|---|---|---|---|
| 935,303 | 9/1909 | Greth | 210/124 X |
| 1,800,517 | 4/1931 | Foster | 210/104 |
| 2,374,772 | 5/1943 | Norberg | 210/109 |
| 3,279,604 | 10/1966 | Levier | 210/104 X |
| 3,487,937 | 1/1970 | Koulouatos | 210/193 |

*Primary Examiner*—John Adee
*Attorney*—Frank A. Steinhilper et al.

[57] ABSTRACT

Water treating apparatus is disclosed that has a first chamber to receive the waste water, a second chamber having a discharge provided with an overflow inlet and an expansion chamber extending downwardly into it to receive within it part of the second chamber contents, and means to transfer first chamber contents into the second chamber. Aeration may be effected in both chambers and when the transfer means into the second chamber and the second chamber aerating means are not working, the second chamber functions as a settling chamber. Means are provided then to deliver air into the expansion chamber to force water out of it thus to raise the second chamber level to cause an overflow through the discharge, the overflow being relatively clear after a predetermined settling interval.

24 Claims, 4 Drawing Figures

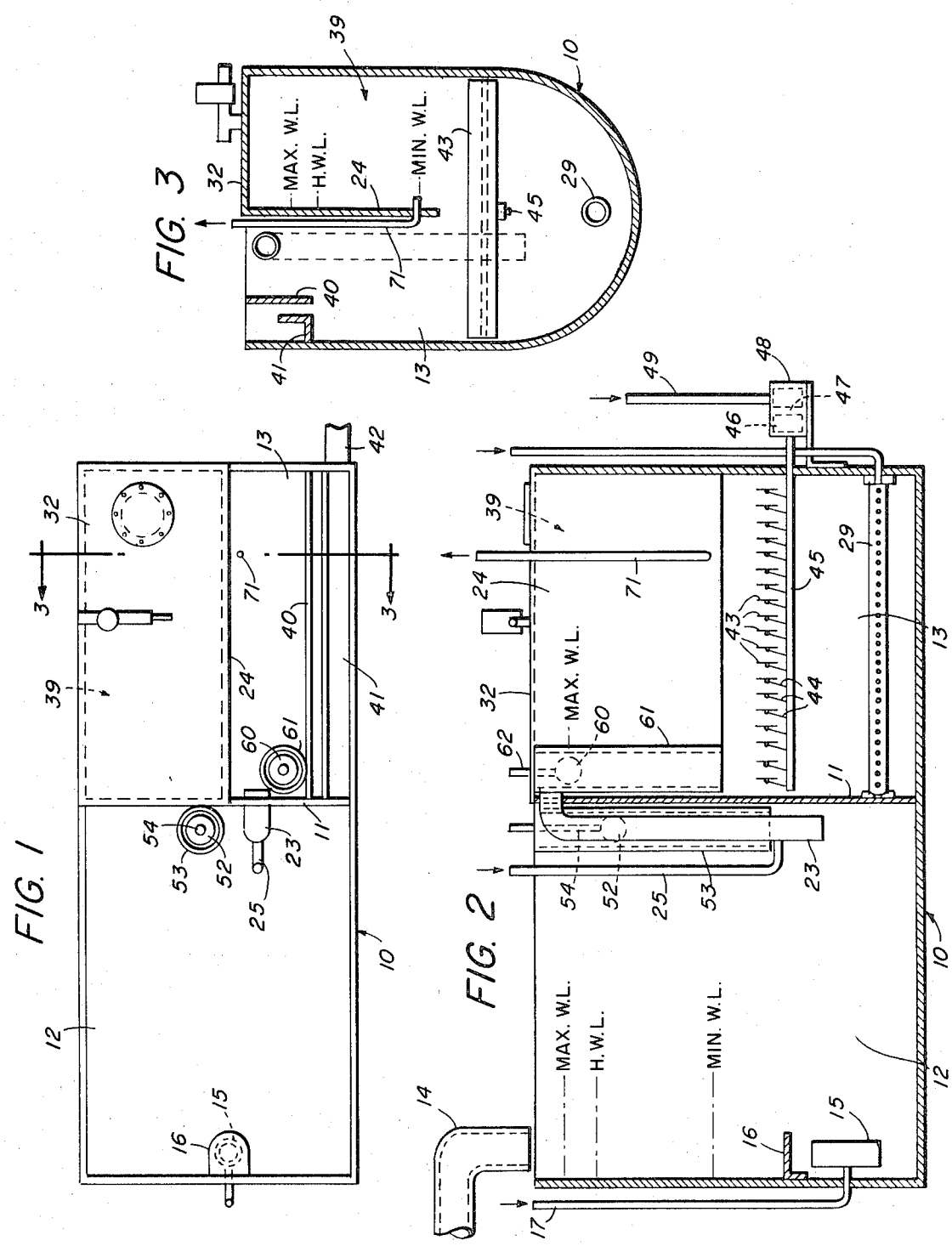

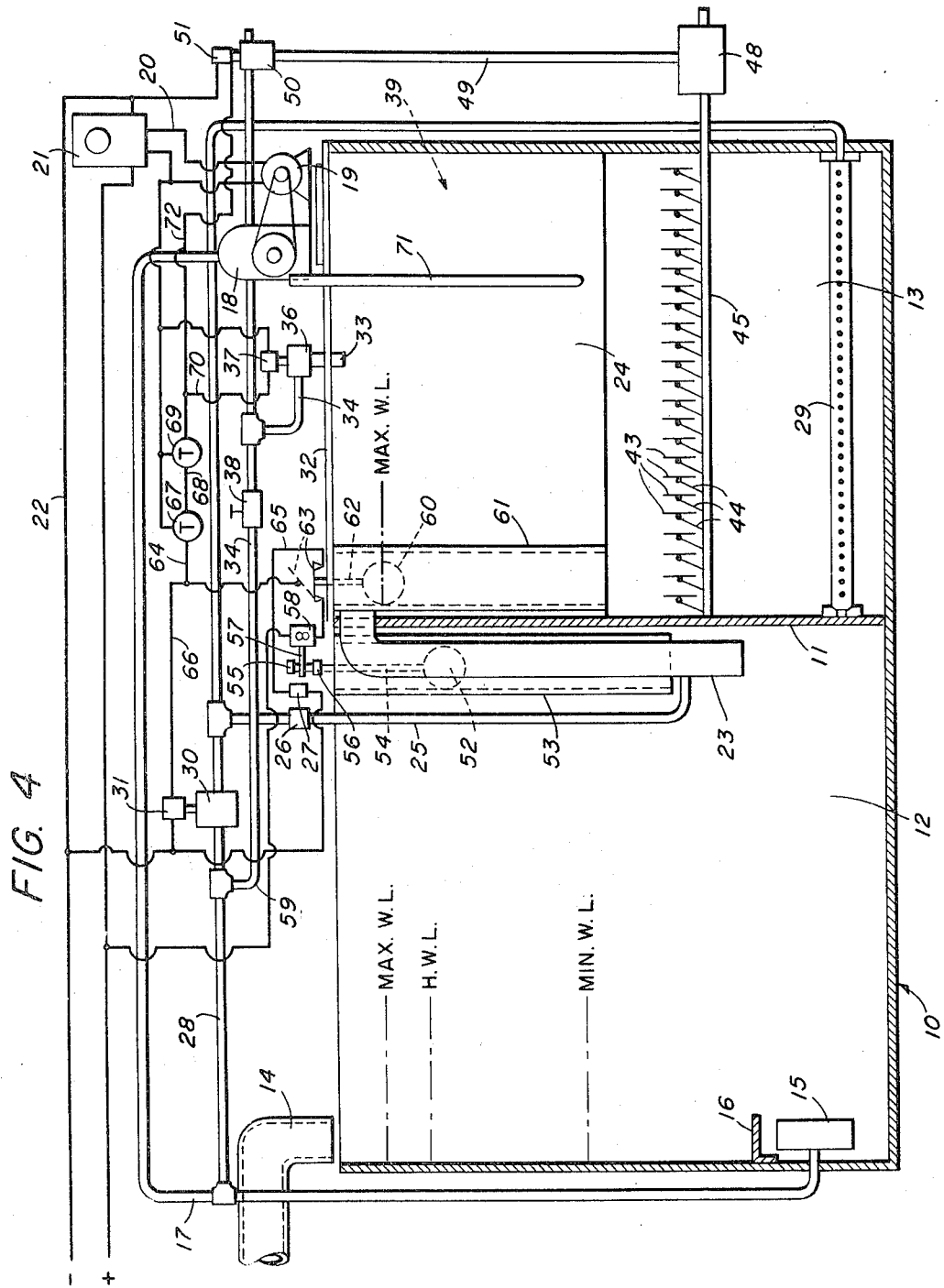

APPARATUS FOR TREATING WASTE WATER

The present invention relates to apparatus for treating waste water and a continuation of my co-pending application Ser. No. 57,290 filed July 22, 1970 now abandoned which in turn is a continuation of my co-pending application Ser. No. 794,118, filed Jan. 27, 1969, now abandoned.

While the disposal of waster water has always been a problem, pollution controls impose requirements that are not met by presently available systems because of their cost, because of their physical dimensions and because of the demand for increased efficiency.

The general objective of the present invention is to provide waste water treatment apparatus that will meet the above generally indicated requirements, an objective attained by providing apparatus that consists of a first chamber to receive the waste water, a second chamber having a discharge, and means to transfer first chamber contents into the second chamber. Both chambers have aerating means. The second chamber has an expansion chamber opening therein to receive part of its contents and provided with air delivery and venting means.

With such apparatus, the second chamber becomes a settling chamber when the transfer and its aerating means are not in operation. With the air delivery and venting means operated after a predetermined settling interval to deliver air into the expansion chamber, the pressure therein builds up to force the liquid contents downwardly to increase the water level in the second chamber externally of the expansion chamber with the relatively clear surface water flowing into the discharge.

Another objective of the invention is to provide a basis of control adapted to automatic operation. This objective is attained by providing means responsive to the water level in the second chamber to prevent the operation of the transfer means unless there is a demand for water in the second chamber as determined by its water level and by providing for the termination of the use of the second chamber as a treating chamber by shutting off the air supply to the second chamber aerator when the water level in the first chamber reaches a predetermined high water level. After a predetermined interval, the timed delivery of air into the expansion chamber is commenced. At the end of timed interval, the water level in the second chamber drops substantially because, the expansion chamber now being vented, water rises therein and aeration in the second chamber is resumed. Because of the drop in the water level in the second chamber, the transfer means are now operated until the low level in the first chamber is reached.

Another objective of the invention is to provide the second chamber with a series of pivoted slat members above the aerating means together with means to position them with the slat member vertically disposed except during the interval in which the expansion chamber is connected to the air delivering means, the slat members then providing a floor. A further objective of the invention is to have the operation of the slats controlled by timing means.

In the accompanying drawings, there is shown an embodiment of the invention illustrative of these and other of its objectives, novel features, and advantages.

In the drawings:

FIG. 1 is a top plan view of a water treatment plant in accordance with the invention;

FIGS. 2 and 3 are sections taken along the indicated lines 2—2 and 3—3, respectively, of FIG. 1; and FIG. 4 is a schematic view of the air circulating and electrical systems and one basis of control.

The treatment plant shown in the drawings consists of a tank 10 having a transverse partition 11 dividing it into a first compartment 12 and a second compartment 13.

A waste water conduit 14 discharges into the compartment 12 which there is located an aerator 15 below a shield 16 to which air is delivered by an air conduit 17 from an air source such as a blower 18 driven by the motor 19 in a circuit 20 controlled by a timer 21 in a circuit 22 by which at predetermined intervals air is delivered to the aerator for a predetermined time.

A conduit 23 in the compartment 12 has it intake disposed adjacent the bottom thereof with its discharge openening through the partition 11 and into the upper part of the compartment 13 at one side of a lengthwise partition 24 extending part way towards the bottom thereof. An air conduit 25 discharges into the conduit 23 to establish, when the normally closed valve 26 is opened by its solenoid 27, see FIG. 4, an air operated lift for transferring the contents of the compartment 12 into the compartment 13. The various valves, solenoids and other control components are schematically shown in FIG. 4 and as they are conventional, they are not detailed. The conduit 25 is connected to a conduit 28 effecting communication between the conduit 17 and an aerator 29 extending lengthwise of the chamber 13 near the bottom thereof. The conduit 28 has a normally opened valve 30 serving both the air lift conduit 25 and the aerator 29 and closed when its solenoid 31 is energized.

The space on the side of the partition 24 that is opposite to that into which the discharge end of the air lift conduit 23 opens is closed by an air tight cover 32 provided with an air inlet 33 connected to an air conduit 34 having a vent 35 under the control of a normally open valve 36 closed when its solenoid 37 is energized. The conduit 34 has an adjustable control valve 38 and is connected to the conduit 28 between the valve 30 and the conduit 17. The space below the cover 32 and above the bottom edge of the partition 24 will hereafter be referred to as the expansion compartment and it is generally indicated at 39.

At the side of the compartment 13 opposite the expansion compartment 39, there is a scum baffle 40 extending lengthwise of the compartment 13 and spaced from a weir channel 41 also extending lengthwise of the compartment 13 and leading to the discharge 42 for treated water, see FIG. 1.

A series of slat members 43 are pivotally supported in the compartment 13 between the aerator 29 and the lower edge of the partition 24. The slat members 43 are provided with cranks 44 joined together by a connecting rod 45 and actuated against the influence of a return spring 46 by an air operated piston 47 within a cylinder 48 to which air is delivered by a conduit 49 provided with a normally closed, cylinder venting valve 50 opened when its solenoid 51 is energized. In the normal situation, the slat members 43 are vertical but are disposed horizontally to establish a floor when air is delivered into the expansion chamber 29 with its vent 35 closed.

The operation of the apparatus will be detailed in connection with particular reference to the control circuitry shown in FIG. 4.

A float 52 is confined in the chamber 12 by a suitable guide indicated at 53 and has a stem 54 provided with adjustable stops 55 and 56 in control of the arm 57 of a switch 58 in a lead 59 from the circuit 22. The switch 58 is closed in response to the float 52 when the contents of the compartment 11 are at the high water mark and open when the water level falls.

A float 60 is confined in the chamber 13 as by the vertical guide 61 and its stem 62 operated a switch 63 to connect the lead 59 to a lead 64 when the liquid in the chamber 13 is at the indicated high water level and to connect a lead 65 to the solenoid 27 when the liquid level in the chamber 13 drops to a predetermined extent.

The operating cycle may be most readily explained by assuming that the compartment 12 is not full to its high water level and its contents are aerated at the intervals and for the intervals controlled by the timer 21. As the valve 30 is in its normal open position, the compartment 13 is being aerated and the vent 35 is open. The slat members 43 are disposed vertically. When the high water level is reached in the compartment 12, the switch 58 is closed in response to the upward travel of the float 52. If at this time, the compartment 13 was not full, the switch 63 would be in a position connecting the lead 65 to the lead 59 thereby energizing the solenoid 27 to open the valve 26 to place the air lift in operation until the rising water level caused the float 60 to actuate the switch 63 then to disconnect the lead 65 and connect the lead 64 to the lead 59.

The lead 64 has a branch lead 66 including the solenoid 31 which, when energized, closes the valve 30 thereby terminating the aeration of the contents of the compartment 13. The lead 64 includes a first timer 67 and the appropriate lead of the motor circuit 20 thereby to provide an air supply independently of the timer 21. The timer 67 at the end of a predetermined settling period closes a lead 68 to a second timer 69 which closes for a predetermined period the lead 70 to the solenoid 37 by which the valve 36 is closed whereby pressure begins a slot build up in the expansion compartment 39 forcing the liquid within it downwardly with a corresponding increasing level of the liquid in the other side of the partition 24 until the relatively clear water overflows into the weir channel 41 and then to the discharge 42. A relief conduit 71 opens through the partition 24 adjacent its bottom edge and discharges above the high water level thus to prevent the escape of air under the partition that would cause turbulence in the compartment 13. The second timer 69 also closes a lead 72 to the solenoid 51 which, when energized, results in the positioning of the slat members 43 as a floor overlying settled solids.

At the end of the timed interval, the leads 70 and 72 are both open with the result that the slat members 43 return to their open or vertical positions and the valve 36 opens permitting air to escape from the expansion compartment 39 through the vent 35. As this occurs, the water in the compartment 13 within and without the compartment 39 reaches the same level and the drop in the level in the vicinity of the float 60 causes it to drop with the switch 63 closing the lead 65 thereby to energize the solenoid 27 by which the valve 26 is opened to set the air operated lift in operation to transfer the contents of the compartment 12 to the compartment 13 until the level in the latter so lifts the float 60 as to reset the switch 63 to mark the end of an operating cycle.

It will be appreciated that the high water level in the compartment 12 at which the switch 58 is operated does not represent the maximum capacity of the compartment 12 as space is provided for any waste water that can be expected during the timed interval in which aeration is stopped in the compartment 13 and after appropriate settling, the clear water discharged to make room for the transfer of some of the compartment 12 contents.

I claim:

1. A water treatment plant comprising a first chamber for the reception of waste water, a second chamber including a discharge having an inlet above a predetermined high water level therein and an expansion chamber opening into the second chamber below said level to receive part of the second chamber liquid within it, aerating means for each chamber, means in communication with both chambers and operable to transfer first chamber contents into the second chamber, means to vent air from the expansion chamber, and control means for the expansion chamber to deliver air into said expansion chamber and operable to force liquid downwardly therefrom thereby to raise the water level in the second chamber externally of the expansion chamber to overflow said discharge inlet and to vent the expansion chamber from the second chamber to lower the water level therein whereby with the transfer means and the aerating means for the second chamber inoperative the second chamber functions as a settling chamber and with the air delivery means to the expansion chamber operating and the vent means inoperative the displacement of the expansion chamber contents causes the overflow of the relatively clear water into the discharge.

2. The water treatment plant of claim 1 and means in control of the operation of the transfer means to initiate its operation when a predetermined high water level exists in the first chamber and a predetermined low water level exists in the second chamber and to terminate its operation when the high level is attained in the second chamber.

3. The water treatment plant of claim 2 and a control for the second chamber aerator operated by the means in control of the transfer means when the high level in the second chamber is attained.

4. The water treatment plant of claim 2 in which the second chamber aerator includes a normally open, solenoid operated valve and a circuit to the solenoid includes switch means operated by the means in control of the transfer means.

5. The water treatment plant of claim 4 in which the switch means is also responsive to the water level in the first chamber.

6. The water treatment plant of claim 2 in which the transfer means is a conduit, an air delivery conduit is in communication with the interior thereof to force liquid through and includes a normally closed, solenoid and switch means responsive to a low water level in the second chamber.

7. The water treatment plant of claim 1 in which the means to deliver air to the expansion chamber also includes a vent and a normally open, solenoid operated valve in control of said vent whereby the expansion chamber is normally vented, timing means, and a circuit controlled by the timing means includes the solenoid of the vent-controlling valve.

8. The water treatment plant of claim 1 in which the control means for the expansion chamber are operable in the alternative to deliver air into the expansion chamber and to vent air therefrom.

9. The water treatment plant of claim 7 and timing means in control of the expansion chamber control means.

10. The water treatment plant of claim 8 in which the air delivery means includes a valve adjustable to control the flow of air to the expansion chamber.

11. The water treatment plant of claim 1 in which the second chamber has a series of pivoted, parallel slat members above the second chamber aerating means, and operating means operable to turn the slat members between vertical and horizontal positions, in their horizontal position, the slat members providing a floor.

12. The water treatment plant of claim 5 in which the second chamber has a series of pivoted, parallel slat members above the second chamber aerating means, means operable to turn the slat members between vertical and horizontal positions, said member turning means including a control member having a first position in which the slat members are vertical and a solenoid operable to move the control member into a second position in which the horizontal positions of the slat members is effected, a circuit controlled by the switch means including said solenoid and is closed with respect thereto when predetermined high water levels exist in both chambers.

13. The water treatment plant of claim 1 and a contuit extending from a point near the bottom of the expansion chamber above the high water level in the second chamber to prevent turbulence that would disturb settled solids.

14. The water treatment plant of claim 1 in which the second chamber has an open discharge extending lengthwise thereof above the high water level therein into which water overflows as water is expelled from the expansion chamber.

15. The water treatment plant of claim 1 in which a scum barrier extends lengthwise of the second chamber close to the discharge.

16. The water treatment plant of claim 1 in which the second chamber includes a lengthwise partition terminating above the bottom thereof but below the low water level therein and an air tight cover closes the space between the partition and the side of the second chamber opposite the transfer means.

17. The water treatment plant of claim 1 and a normally open valve in control of the second chamber aerating means and including a valve-closing solenoid, a normally closed valve in control of the transfer means and including a valve-opening solenoid, the control means for the expansion chamber are normally operative to vent the expansion chamber and include solenoid means which when energized operate the control means to deliver therein liquid expelling air, and a control circuit including switch means responsive to the water level in the two chambers and operable to energize the solenoid of the transfer means when a high water level exists only in the first chamber, to energize the solenoid means when a high water level exists in both chambers.

18. The water treatment plant of claim 17 in which the circuit includes timing means in control of the solenoid means.

19. The water treatment plant of claim 18 in which the timing means provide first a predetermined settling interval and then a predetermined interval in which air is delivered into the expansion chamber.

20. The water treatment plant of claim 19 in which there is a common air source for the aerating means, the transfer means, and the air delivery means, the air source includes an electric motor and an operating circuit therefor including a timer whereby both chambers are periodically subjected to aeration and the control circuit includes the motor when the solenoid means is energized.

21. The water treatment plant of claim 19 in which the second chamber has a series of pivoted, parallel slat members above the second chamber aerating means, operating means to turn the slat members between vertical and horizontal positions, in their horizontal positions, the slat members providing a floor, means normally holding the slat members in their vertical positions and including a solenoid to effect their horizontal positions when energized, and the circuit includes that solenoid during the interval air is delivered into the expansion chamber.

22. A water treatment plant comprising a first chamber for the reception of waste water, a second chamber including a discharging means, a timed aerator in communication with the second chamber, means in communication with both chambers and operable to transfer first chamber contents into the second chamber, means in control of the operation of the transfer means to initiate its operation when a predetermined high water level exists in the first chamber and a predetermined low water level exists in the second chamber and to terminate its operation when a predetermined high level is attained in the second chamber, and a control operated when the high level in the first chamber is attained first to terminate aeration in the second chamber for a predetermined interval and then also to operate said discharging means for the balance of that interval whereby said second chamber operates both as an aeration chamber and a settling chamber.

23. The treatment plant of claim 22 in which there is also an aerator in communication with the first chamber and both aerators include a common source.

24. A water treatment plant comprising a first chamber for the reception of waste water, a second chamber including a discharging means, a timed aerator in communication with the second chamber, means in communication with both chambers and operable to transfer first chamber contents into the second chamber, means in control of the operation of the transfer means to initiate its operation when a predetermined high water level exists in the first chamber and a predetermined low water level exists in the second chamber and to terminate its operation when a predetermined high level is attained in the second chamber and a control operated first to aerate said second chamber then to terminate aeration in the second chamber for a predetermined interval, and then also to operate said discharging means for the balance of that interval whereby said second chamber operates both as an aeration chamber and a settling chamber.

* * * * *